United States Patent [19]

Jacob

[11] Patent Number: 4,968,287

[45] Date of Patent: Nov. 6, 1990

[54] CONSTANT VELOCITY RATIO UNIVERSAL JOINT

[75] Inventor: Werner Jacob, Frankfurt am Main, Fed. Rep. of Germany

[73] Assignee: Uni-Cardan AG

[21] Appl. No.: 471,352

[22] Filed: Jan. 29, 1990

[30] Foreign Application Priority Data

Feb. 16, 1989 [DE] Fed. Rep. of Germany ....... 3904655

[51] Int. Cl.$^5$ .............................................. F16D 3/23
[52] U.S. Cl. ..................................... 464/145; 464/906
[58] Field of Search .................... 464/139, 141–146, 464/9065

[56] References Cited

U.S. PATENT DOCUMENTS

| | | | |
|---|---|---|---|
| 4,185,476 | 1/1980 | Krude | 464/145 |
| 4,589,857 | 5/1986 | Okoshi | 464/145 |
| 4,608,028 | 8/1986 | Welschof et al. | 464/145 |
| 4,820,240 | 4/1989 | Girguis | 464/145 |
| 4,915,672 | 4/1990 | Girguis | 464/145 |

*Primary Examiner*—Thomas R. Hannon
*Attorney, Agent, or Firm*—Toren, McGeady & Associates

[57] ABSTRACT

A constant velocity ratio universal joint comprises a hollow outer joint member (1), an inner joint member (2), a plurality of balls engaging grooves (5, 14) in meridian planes in the outer and inner joint members, and a cage (17) with windoes (21) wherein the balls are guided. The grooves in the joint members ae of non-undercut configuration considered from one end (6) of the outer joint member, and between its grooves the inner joint member has a spherical surface (13) which engages a complementary surface (8) on a member (9) connected to he outer joint member at its end (6) to center the joint members relative to one another. The cage has an internal part-spherical surface (18) which engages the surface (13) of the inner joint member, the surface (18) extending from the cage end oppsite the end (6) of the outer joint member, and ending before a plane containing the centers of the balls, while the outer surface of the cage has a clearance from the internal surface of the outer joint member. The configuration of the grooves is such that the balls always engage them with a cage control angle $\beta$ which is at least 7°, sufficient to hold the cage surface (18) in engagement with the inner joint member and prevent any tendency for the joint to become jammed against articulation. The joint is able to articulate with low frictional resistance.

8 Claims, 6 Drawing Sheets

CONSTANT VELOCITY RATIO UNIVERSAL JOINT

BACKGROUND OF THE INVENTION

Field of the Invention

This invention relates to a constant velocity ratio universal joint, comprising:

a hollow outer joint member, having an internal surface provided with grooves extending in meridian planes about the axis of the member;

an inner joint member disposed within the outer joint member, and having an external surface having grooves extending in meridian planes about the axis of the inner joint member, facing the grooves in the outer joint member in pairs;

a plurality of balls disposed one in each facing pair of said grooves, for torque transmission between the joint members;

the grooves of each pair diverging from one another towards one end of the joint, and the bases of the grooves in each member being of non-undercut configuration considered from said end of the joint;

and a cage of annular configuration disposed between the outer and inner joint members and having windows wherein the balls are guided.

In joints as above set forth, it is usual to provide the cage with external and internal part-spherical surfaces, which are guided respectively on the internal and external surfaces of the outer and inner joint members between the grooves thereof. Such joints have the disadvantage in that extremely accurate production is necessary in order to achieve the required guidance of the cage. Inaccuracy can lead to the joints having a self-generated resistance to articulation, tending to "catch" or become jammed, so that a higher force has to be applied to the joint to cause it to articulate, especially starting from the aligned (non-articulated) condition.

SUMMARY OF THE INVENTION

It is accordingly the object of the present invention to provide a constant velocity ratio universal joint whose efficiency is improved in that accurately controlled conditions of friction and play are established, so that the above described problem of catching of the joint and self-inhibition of articulation, especially from the aligned condition, is avoided.

According to the invention, we provide a constant velocity ratio universal joint comprising:

a hollow outer joint member, having an internal surface provided with grooves extending in meridian planes about the axis of the member;

an inner joint member disposed within the outer joint member, and having an external surface having grooves extending in meridian planes about the axis of the inner joint member, facing the grooves in the outer joint member in pairs;

a plurality of balls disposed one in each facing pair of said grooves, for torque transmission between the joint members;

the grooves of each pair diverging from one another towards one end of the joint, and the bases of the grooves in each member being of non-undercut configuration considered from said end of the joint;

and a cage of annular configuration disposed between the outer and inner joint members and having windows wherein the balls are guided;

the inner joint member having a part-spherical surface engaging a complementary surface associated with the outer joint member in the region of the axis thereof at said end of the joint;

the cage having an internal part-spherical surface engaging the part-spherical surface of the inner joint member at the opposite end of the joint, said internal part-spherical surface of the cage ending before a plane containing the centers of the cage windows;

the external surface of the cage having clearance from the internal surface of the outer joint member between the grooves thereof;

the balls engaging the grooves in contact tracks such that for each ball its oppositely disposed points of contact with its facing pair of grooves, throughout the entire working range of joint articulation and for all angular positions of joint rotation, provide a cage control angle sufficient to prevent self-inhibition of joint articulation. Preferably the cage control angle is greater than 7°.

The advantage of a joint according to the invention is that the cage is centered on the inner joint member (which is in turn centered relative to the outer joint member by the engagement of the part-spherical surface of the inner joint member with the complementary surface associated with the outer joint member), by the balls pressing against the cage and causing the internal part-spherical surface of the latter to engage the part-spherical surface of the inner joint member at the opposite end of the joint. There is no need for the cage to be further supported by contact with the outer joint member, and the clearance therebetween eliminates one source of friction from the joint. The cage control angle established (as described hereafter) between the oppositely disposed points of contact of each ball with its pair of grooves ensures that the ball presses against the cage adequately to guide it.

By having the internal part-spherical surface of the cage of limited extent, so that it ends before the plane containing the centers of the cage windows, the friction between the cage and inner joint member is further reduced. The possibility of increased friction therebetween leading to jamming of the joint is avoided.

The choice of the cage control angle further ensures that the balls are always urged into engagement with the boundaries of the windows in the cage adjacent the end of the joint having the part-spherical surface associated with the outer joint member. In this way, the internal part-spherical surface of the cage is always kept in contact with the part-spherical external surface of the inner joint member. These measures improve joint efficiency and reduce heating of the joint caused by friction.

The joint may be a so-called offset joint, wherein the grooves in the joint members as viewed in said meridian planes at least partially are of arcuate configuration with the centers of curvature of the grooves in the joint members equally offset on opposite sides of the plane containing the centers of the balls when the joint is in the aligned condition, with the angle of offset between imaginary lines connecting the center of each ball to the center of articulation of the joint on one hand and said centers of curvature on the other hand always being greater than 7°.

This measure avoids the risk of jamming or self-inhibition of freedom of movement of the balls in the grooves of offset joints. This arrangement of the centers of the grooves gives the cage control angles according to the invention as above set forth.

However, it is also possible to provide other shapes of the ball-receiving grooves to achieve a cage control angle according to the invention.

Preferably the ball-receiving grooves in the outer and inner joint members have a cross-sectional shape which is not arcuate and is such that each ball has two points of contact with each groove. As compared with a groove of part-circular cross-sectional shape (which must be of greater radius of curvature than the ball radius), wherein the ball has to run up one or other side of the groove according to which direction torque is being transmitted, until the ball has contact with the groove at the required pressure angle, a groove shape according to the invention has contact points available immediately to the ball for both directions of torque transmission.

The contact tracks along the length of the grooves formed by the points of contact of the balls therewith, throughout the range of articulation of the joint, are preferably spaced from the edges of the grooves by a distance greater than half the major axis dimension of the pressure ellipses established by the ball-groove contact under the permitted torque and at the respective articulation angle. This prevents interference with joint articulation due to distortion of the edges of the grooves which may affect the engagement between the inner joint member and cage.

Preferably towards the two axial ends of the contact tracks the major axis dimensions of the pressure ellipses are smaller than in the central region of the contact tracks. This feature is proposed in order to take account of the groove depth, which decreases towards the ends of the grooves in the joint members. It is acceptable because when the joint is articulated there is only one ball in each of the respective extreme positions in the grooves, and due to elastic deformation the remaining balls make a greater contribution towards torque transmission.

One way in which such a change in the major axis dimension of the pressure ellipse can be achieved is to change the cross-sectional shape of the grooves towards their end regions, to change the conformity between the curvature of the ball and groove in the plane, transverse to the groove, which contains the major axis of the pressure ellipse. If the ratio of the radius of curvature of the groove side as viewed in such plane, to the radius of curvature of the ball, is increased, then the major axis dimension of the pressure ellipse is reduced. Another way of reducing the size of the pressure ellipse is to change the cross-sectional shape of the grooves, e.g. by extending their width, in such a way that, even with unchanged conformity between ball and groove, the force component between ball and groove which establishes the pressure ellipse is reduced, to obtain a smaller pressure ellipse.

BRIEF DESCRIPTION OF THE DRAWINGS

The invention will now be described by way of example with reference to the accompanying drawings, wherein.

DESCRIPTION OF PREFERRED EMBODIMENT

Figure 1:
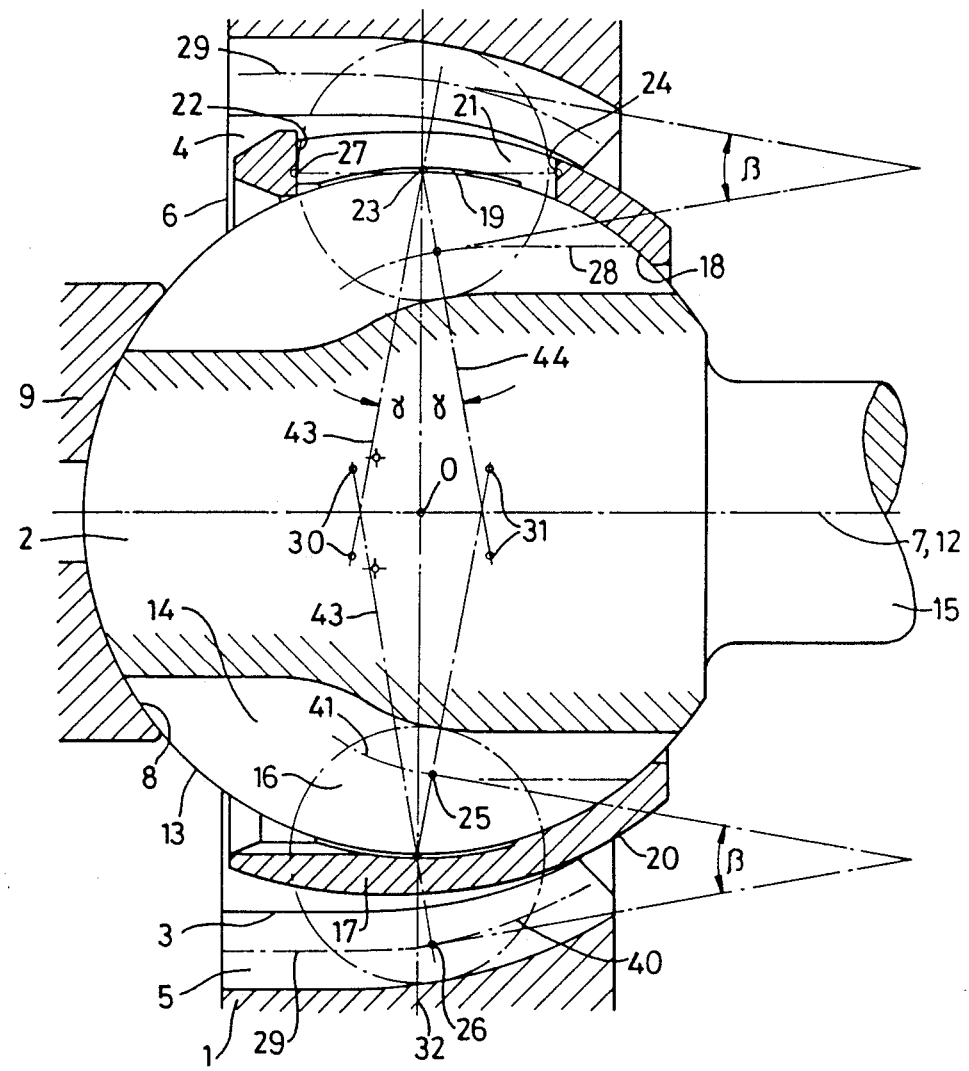
FIG. 1 is a longitudinal section through part of a constant velocity ratio universal joint according to the present invention, in the aligned (non-articulated) condition.
Figure 2:
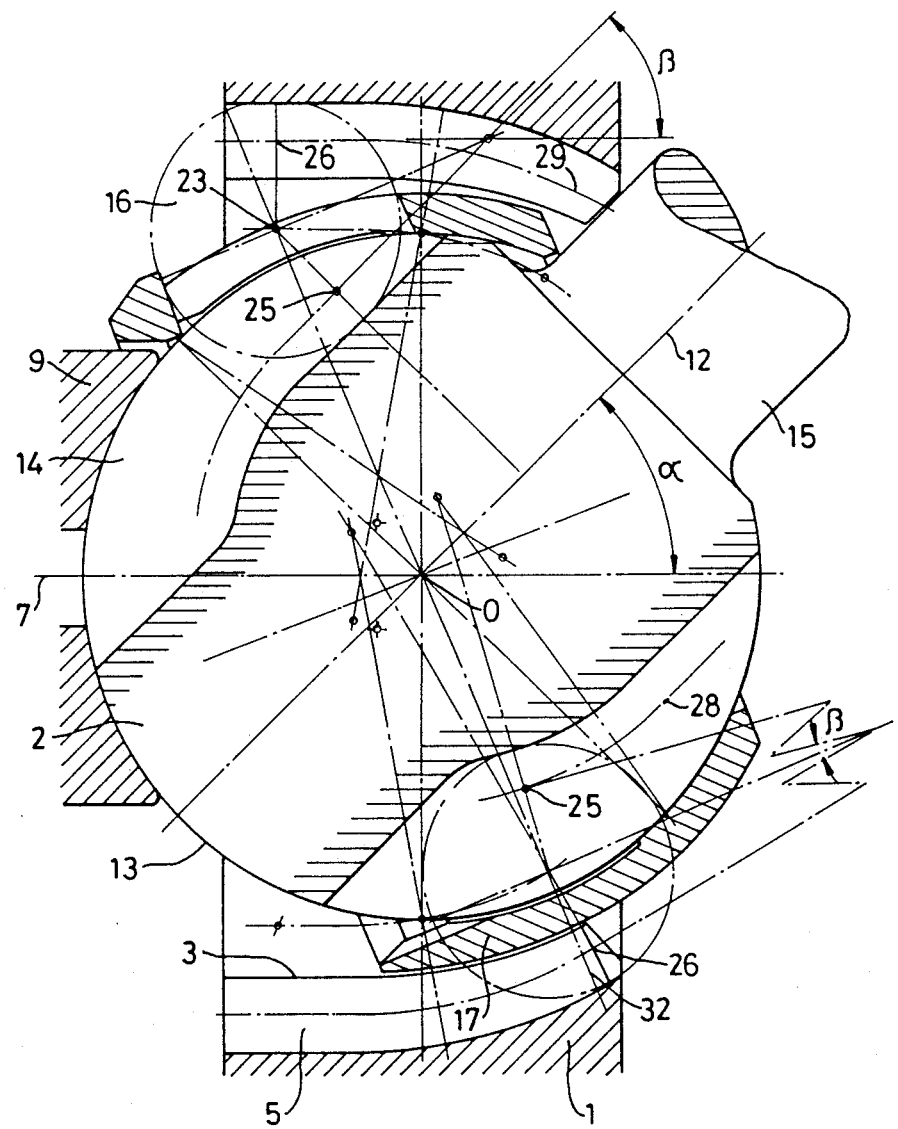
FIG. 2 is a section through the joint of FIG. 1, under the condition of maximum articulation.
Figure 3:
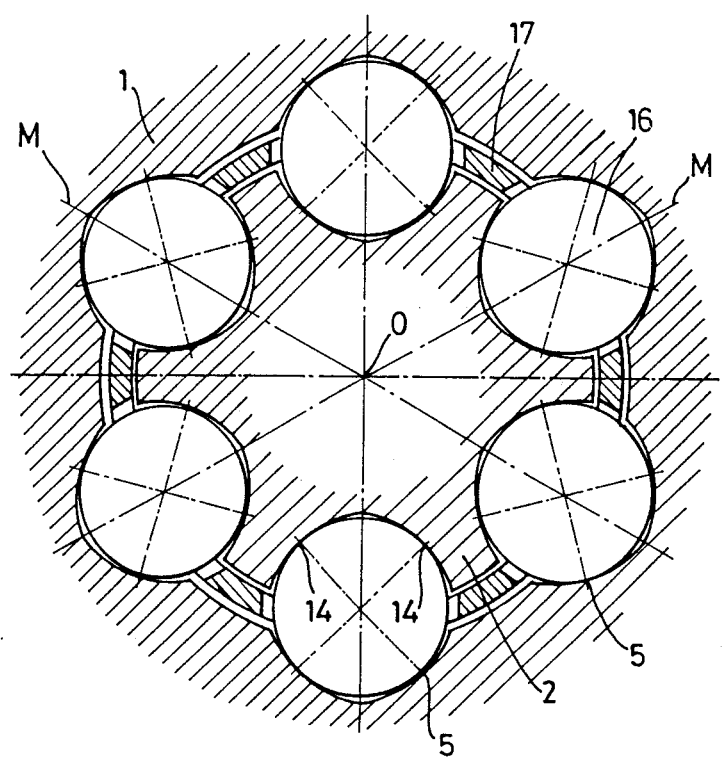
FIG. 3 is a transverse cross-section of the joint of FIG. 1.

Referring firstly to FIGS. 1 to 3 of the drawings, the constant velocity ratio universal joint shown comprises an outer joint member 1 of hollow configuration, with an interior space 4 in which is disposed an inner joint member 2. The outer joint member has in its interior six circumferentially equally spaced grooves 5 whose center lines occupy meridian planes M. The inner joint member has six correspondingly circumferentially spaced grooves 14 in meridian planes, facing the grooves 5 in the outer joint member in pairs. A plurality of balls 16 are disposed one in each facing pair of grooves 5, 14, for torque transmission between the members. A cage 17 of annular configuration is disposed between the joint members, the balls occupying windows in the cage.

From one axial end 6 of the outer joint member 1, the grooves 5 therein are of non-undercut configuration, approaching the rotational axis 7 of the joint member as they extend towards the other end thereof. Between the grooves 5, the internal surface 3 of the outer joint member is also of non-undercut configuration, approaching the axis 7. This means that the outer joint member may be made by a precision forming method without there being any requirement for subsequently machining the shape of the grooves 5 and surface 3.

The cross-sectional shape of the grooves 5 is visible in FIG. 3, and is non-circular, such that each ball has two-point contact with its groove. As the balls 16 shown in FIG. 1 move along their grooves 5, the contact track formed by the point of contact of each ball with one side of its groove is indicated at 29. Each of the contact tracks 29 has a portion 40 which is of arcuate form, of radius 43 and center of curvature 30 which is offset radially from the axis 7 of the outer joint member and offset axially from the center of articulation O of the joint. When the joint is transmitting contact with one of its contact points in its groove in the inner joint member and the diametrically opposed one of its contact points in its groove in the outer joint member.

The inner joint member 2 has a rotational axis 12 which in FIG. 1 coincides with the rotational axis 7 of the outer joint member. Between its grooves 14, the inner joint member has an external surface 13 which is of part-spherical configuration. The grooves 14 in the inner joint member are of non-undercut configuration considered from the end of the inner joint member adjacent the end 6 of the outer member so that they can be produced by precision forming techniques. As for the grooves in the outer joint member, the balls have two-point contact with the grooves 14 in the inner joint member, and the contact tracks thereof are indicated by the lines 28. Each contact track includes a portion 41 of arcuate configuration, with center of curvature 31. The centers of curvature 31 of the arcuate portions of the contact tracks in the inner joint member are offset radially from the rotational axis 12 of the inner joint member, and offset axially from the joint center of articulation O, on the opposite side thereof to the centers of curvature 30 of the arcuate portions of the contact tracks in the outer joint member, by an equal distance.

Figure 4:
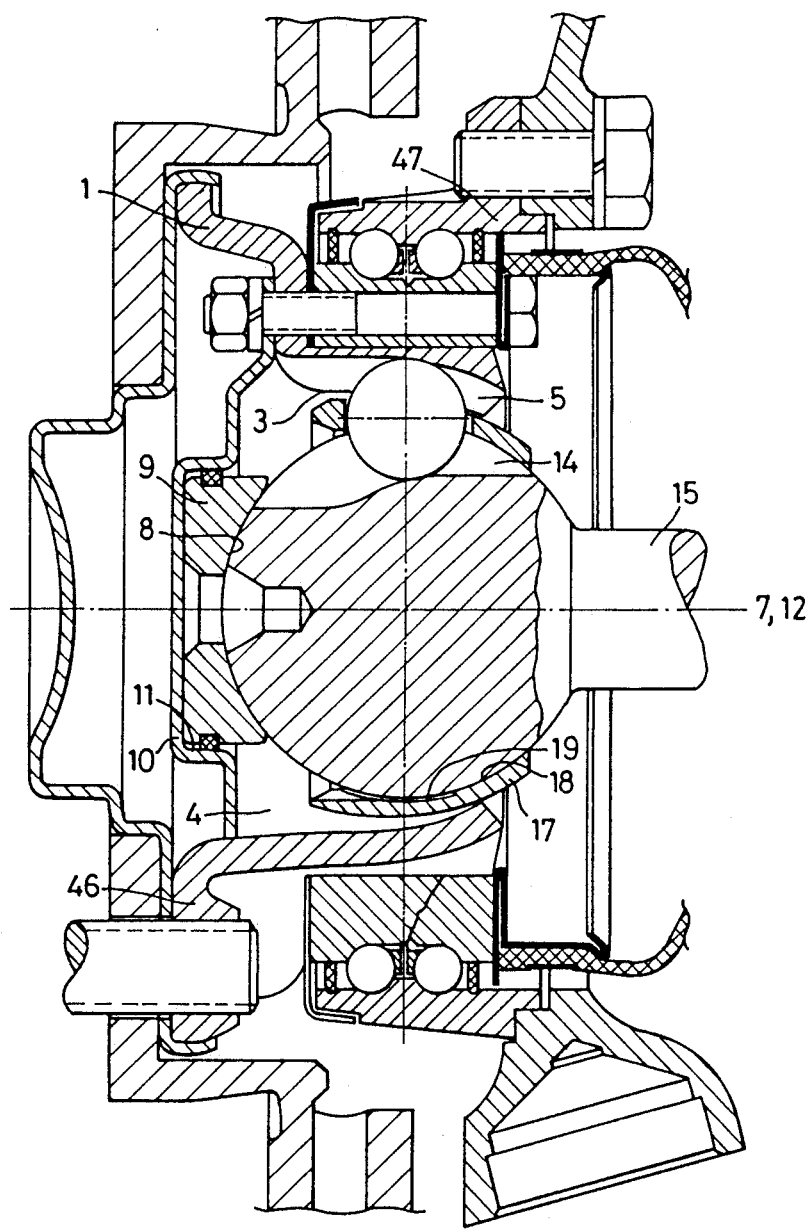
FIG. 4 is a longitudinal section through a wheel hub assembly incorporating the universal joint.
Figure 5:
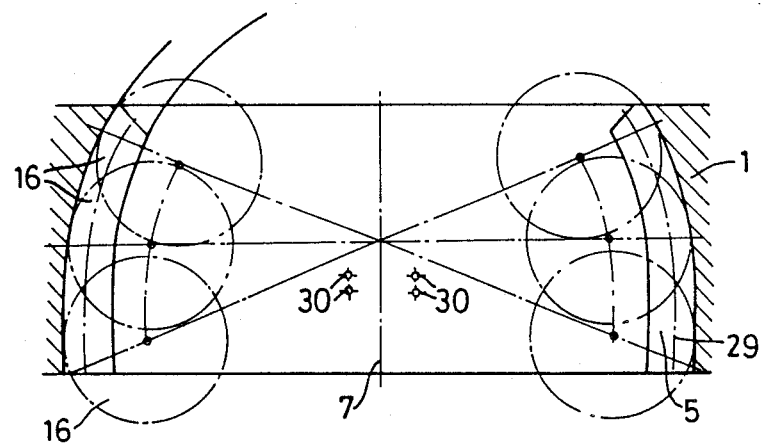
FIGS. 5 and 6 are respectively sections showing the conditions of engagement of balls in the grooves in the outer and inner joint members, as the joint is articulated.
Figure 6:
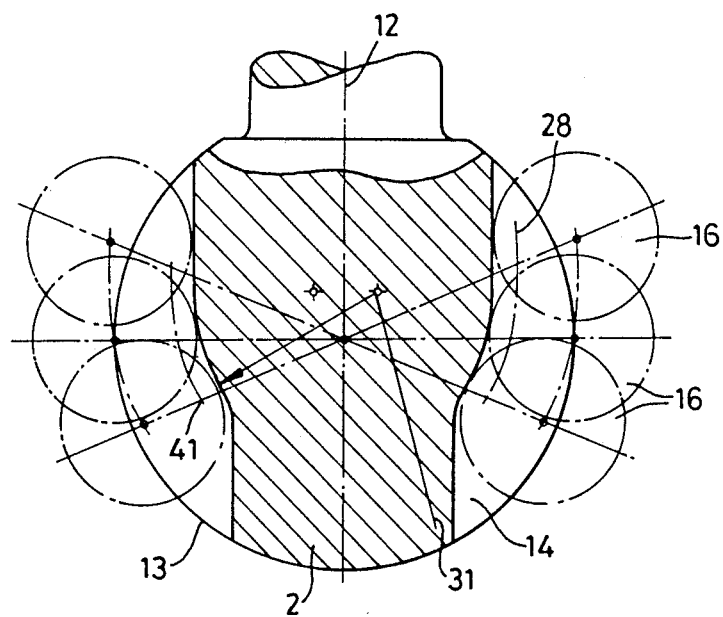

At its end adjacent the larger open end 6 of the outer joint member, the part-spherical external surface 13 of the inner joint member 2 engages a complementary surface 8 provided on a member 9 associated with the outer joint member. The member 9 is held relative to the outer joint member in a hub assembly such as is shown in FIG. 4 of the drawings. The surface 8 is in the region of and extends about the axis 7 of the outer joint member. The opposite end of the inner joint member has a shaft element 15, preferably integral therewith, which is or provides for connection to a torque transmitting drive shaft.

The cage 17 of annular form, disposed between the internal surface 3 of the outer joint member 1 and the external surface 13 of the inner joint member 2, has windows 21 wherein the balls 16 are received. The cage has a part-spherical internal surface 18 which extends from the end of the cage adjacent the shaft element 15, and ends before it reaches the plane (32) containing the centers (23) of the balls 16, which plane substantially corresponds to the plane containing the centers of the windows 21.

The distance between the start of the part-spherical internal surface 18, adjacent the balls 16, and the ball center plane 32 is such that with reference to the joint center O (which is also the center of the part-spherical surface 13 of the inner joint member and the cage surface 18 in engagement therewith) an angle greater than 7° is subtended. This angle ensures that, when the joint is in the aligned condition and the axes 7, 12 coincide, jamming or self-inhibition of joint articulation cannot occur.

From the limit of its internal part-spherical surface 18 to its end adjacent the end 6 of the outer joint member, the cage has an internal surface 19 which is not in contact with the external surface 13 of the inner joint member. The windows 21 in the cage wherein the balls 16 are received comprise axially spaced boundary faces 22, 24, and the above described configuration of the contact tracks 28, 29 of the balls with the grooves in the joint member ensure that each ball 16 rests against the window face 22 adjacent the end 6 of the outer joint member, with a contact point 27. There is some clearance between the balls and the opposite window faces 24. Such contact conditions are also established by the offset of the centers 30, 31 relative to the ball center plane 32.

FIG. 2 shows the joint at its angle $\alpha$ of maximum articulation. For each of the visible balls there is shown the angle $\beta$ between the tangents at its opposed points of contact 25, 26 with the grooves in the joint members. The configuration of the grooves is such that for all angles within the range of joint articulation, the angle $\beta$ is greater than 7°, so that the balls are always urged into engagement with the faces 22 of the windows in the cage. This contact angle or cage control angle is sufficient to ensure that the cage has its internal part-spherical surface 18 urged into engagement with the external part-spherical surface 13 of the inner joint member, to center the cage relative to the inner joint member, when the joint is transmitting torque. When the cage is thus held, its external surface 20 has a clearance from the internal surface 3 of the outer joint member 1. The accurately centered positioning of the cage 17 and inner joint member 2 together relative to the outer joint member is ensured by the engagement of the inner joint member with the surface 8 on member 9.

The connecting line between the center 23 of each ball and the centers of curvature 30, 31 of the arcuate parts of the contact tracks 28, 29 of the ball in the grooves in the inner joint member and outer joint member respectively has been given the reference number 43 and 44 respectively. Between each of these connecting lines 43, 44 respectively and the plane 32 containing the center of the balls there is defined the angle of offset $\gamma$.

FIG. 4 shows the universal joint arranged in a wheel hub assembly. The outer joint member 1 is a component formed from sheet metal, and has a flange 46 providing for attachment of a brake disc and a wheel (not shown). The external surface of the outer joint member is of a configuration for receiving the inner race or races of a wheel bearing assembly thereon. Secured to the outer joint member by bolts is a sheet metal cap 10 which affords a recess 11 in which is received the member 9 having the surface 8 engaged by the inner joint member.

To assemble the joint, the cage, balls and inner joint member must be introduced into the outer joint member from the end 6 thereof, before the cap 10 and member 9 can be fitted. As an alternative to the use of bolts for connecting the cap 10, a low distortion welding process such as is described in German Patent Application No. P37 39 867.9 may be utilised. Instead of the separate member 9 affording the surface 8, the cap 10 may be provided with such surface.

To improve the conditions of friction in respect of the cage of the joint, the internal part-spherical surface 18 of the cage may be provided with grooves to assist flow and distribution of lubricant. It will be noted that there is no contact between the cage and the internal surface of the outer joint member.

Figure 7:
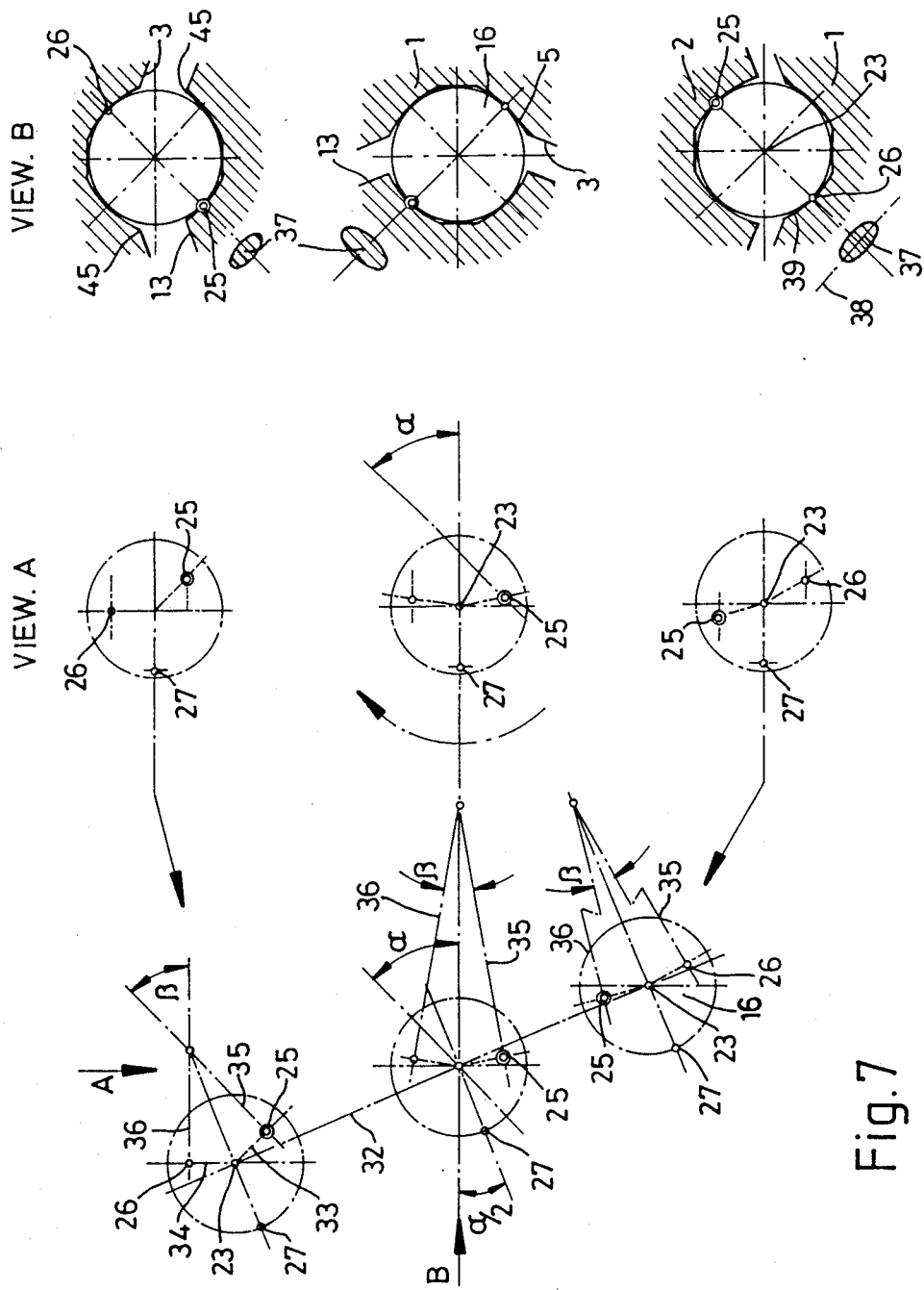
FIG. 7 shows, in different views, the engagement between ball and groove for balls in different positions in an articulated joint.

Referring finally now to FIG. 7 of the drawings, this shows the conditions of contact with the grooves in the joint members of the balls disposed at different positions circumferentially about a joint articulated as in FIG. 2. On the left-hand side of FIG. 7, there is shown uppermost the ball which appears uppermost in FIG. 2, and lowermost the ball which is shown lowermost in FIG. 2. Between these two, there is shown a ball which can be considered as being disposed circumferentially midway between the positions of the other two balls, although it will be appreciated that in a six ball joint there is not a ball actually in such a circumferential position. FIG. 7 also shows, for each of the ball positions, the view in the direction of arrow A thereon and the view in the direction of arrow B thereon.

In the various views shown in FIG. 7, the point of contact of each ball with its groove 14 in the inner joint member 2, in the direction of torque transmission, is indicated as 25 whilst the corresponding opposite contact point of the ball with the groove 5 in the outer joint member 1 is indicated at 26. The respective views B show the position of the contact points 25, 26 relative to the edges 44, 45 of the grooves. Each contact point 25, 26 establishes a pressure ellipse 37 (i.e. an elliptical area of contact between ball and groove resulting from the slight deformation which occurs in the region of the contact "points" under torque transmission. The dimensions of the major and minor axes of the pressure ellipses result from the osculation conditions between the balls and the engaged sides of the grooves i.e. the conformity between the curvatures of the balls and of the groove sides in the mutually perpendicular planes, transverse to and lengthwise of the groove, containing each contact point. The distance between the contact points 25, 26 and the groove edges 44, 45 is such that it is greater than half the major axis dimension 38 of the pressure ellipse 37. This avoids any deformation occurring at the edges 44, 45 of the grooves.

It will be noted that the size of the pressure ellipse 37 is greater for the ball which is at the center of its grooves than it is for the balls, uppermost and lowermost in FIG. 7, which are at the respective ends of their grooves. In order to achieve this change in the size of the pressure ellipse, the conformity between the balls and grooves may be changed by changing the groove shape towards the ends thereof so that the ratio of the radius of curvature of the groove side, as viewed in the relevant plane, to the radius of curvature of the ball, is increased. This ensures that with decreased groove depth towards the ends of the grooves, particularly in the inner joint member, approach of the pressure ellipse too close to the groove edge does not cause distortion of the groove edge, which could affect the engagement between the internal surface of the cage and the inner joint member.

As above referred to, the cage control angle $\beta$ is the angle which ensures the internal part-spherical surface 18 of the cage is held in engagement with the external part-spherical surface 13 of the inner joint member, due to the balls 16 pressing against the respective cage window faces 22. To achieve this, the cage control angle $\beta$ has to exceed a certain value under all conditions of joint articulation, and it is this which enables the cage to have a clearance from the outer joint member. According to the teaching of the invention, the cage control angle always has to be greater than the angle at which any tendency for jamming might occur which could self-inhibit joint articulation. In practice, this means that the cage control angle has to be greater than 7°.

As can be seen from FIG. 7, the cage control angle $\beta$ is visible as the angle contained at the intersection of lines 35, 36 which are tangents to the ball at its contact points. Thus the lines 35, 36 are respectively perpendicular to lines 33, 34 which join the center 23 of a ball to its contact points 25, 26 with the grooves in the inner and outer joint members respectively. It will be appreciated that in the drawings of the balls on the left-hand side of FIG. 7, the contact points 25, 26 do not lie in the drawing plane and the lines 35, 36 have been projected into the drawing plane.

From the point of view of establishing the cage control angle $\beta$, the most difficult conditions occur at the ball which is at the bottom of FIG. 2 and as shown at the bottom of FIG. 7. For this ball also, the angle $\beta$ must be at least 7°. For an offset joint, this condition is assured when the angle of offset as shown in FIG. 2 is at least 7°. For balls which are higher up than the lowermost ball, the angle $\beta$ becomes greater so the required cage control conditions are always obtained.

The above described special contact conditions and cage control achieved thereby cannot only be achieved by contact tracks 28, 29 of arcuate configuration but by other track shapes. The contact tracks must, however, provide the minimum cage control angle of 7° for all the balls, as well as achieving the required positions of the contact points 25, 26 relative to the groove edges 45.

Other cross-sectional shapes of grooves may be provided, for example gothic arch or elliptical shapes. Such grooves also provide two-point contact of the balls therewith, with oppositely disposed contact points effective when torque is being transmitted.

I claim:

1. A constant velocity ratio universal joint comprising:
   a hollow outer joint member, having an internal surface provided with grooves extending in meridian planes about the axis of the member;
   an inner joint member disposed within the outer joint member, and having an external surface having grooves extending in meridian planes about the axis of the inner joint member, facing the grooves in the outer joint member in pairs;
   a plurality of balls disposed one in each facing pair of said grooves, for torque transmission between the joint members;
   the grooves of each pair diverging from one another towards one end of the joint, and the bases of the grooves in each member being of non-undercut configuration considered from said end of the joint;
   and a cage of annular configuration disposed between the outer and inner joint members and having windows wherein the balls are guided;
   the inner joint member having a part-spherical surface engaging a complementary surface associated with the outer joint member in the region of the axis thereof at said end of the joint;
   the cage having an internal part-spherical surface engaging the part-spherical surface of the inner joint member at the opposite end of the joint, said internal part-spherical surface of the cage ending before a plane containing the centers of the cage windows;
   the external surface of the cage having clearance from the internal surface of the outer joint member between the grooves thereof;
   the balls engaging the grooves in contact tracks such that for each ball its oppositely disposed points of contact with its facing pair of grooves, throughout the entire working range of joint articulation and for all angular positions of joint rotation, provide a cage control angle sufficient to prevent self-inhibition of joint articulation.

2. A joint according to claim 1 wherein said cage control angle is greater than 7°.

3. A joint according to claim 1 wherein the grooves in the joint members, as viewed in said meridian planes, at least partially are of arcuate configuration with the centers of curvature of the grooves in the joint members equally offset on opposite sides of the plane containing the centers of the balls when the joint is in the aligned condition, with the angle of offset defined between imaginary lines connecting the center of each ball to the center of articulation of the joint on one hand and said centers of curvature on the other hand always being greater than 7°.

4. A joint according to claim 1 wherein the grooves have a non-circular cross-sectional shape such that the balls have two-point contact therewith.

5. A joint according claim 1 wherein the contact tracks formed by the points of contact of the balls with the grooves, through the range of articulation of the joint, are spaced from the edges of the grooves by a distance greater than half the major axis dimension of the pressure ellipses established by contact of the balls with the grooves.

6. A joint according to claim 5 wherein, towards the ends of the contact tracks, the major axis dimensions of the pressure ellipses are smaller than in the central region of the contact tracks.

7. A joint according to claim 6 wherein, towards the end of the contact tracks, the conformity ratio of the radius of curvature of the groove sides to the radius of curvature of the balls is increased.

8. A joint according to claim 6 wherein, towards the end of the contact tracks, the groove cross-section is extended to decrease the force component between ball and groove side.

* * * * *